(12) United States Patent
Van Der Lelij

(10) Patent No.: US 8,413,738 B2
(45) Date of Patent: Apr. 9, 2013

(54) AGRICULTURAL IMPLEMENT WITH ACCUMULATOR SUSPENSION

(75) Inventor: Bart Van Der Lelij, Abbenbroek (NL)

(73) Assignee: Lely Patent N.V., Maassluis (NL)

( * ) Notice: Subject to any disclaimer, the term of this patent is extended or adjusted under 35 U.S.C. 154(b) by 0 days.

(21) Appl. No.: 13/537,072

(22) Filed: Jun. 29, 2012

(65) Prior Publication Data

US 2012/0267132 A1    Oct. 25, 2012

Related U.S. Application Data

(63) Continuation of application No. PCT/NL2010/000168, filed on Dec. 9, 2010.

(30) Foreign Application Priority Data

Jan. 5, 2010   (NL) ...................................... 1037612

(51) Int. Cl.
*A01B 63/00* (2006.01)
(52) U.S. Cl.
USPC ............................................. 172/459; 172/2
(58) Field of Classification Search .................. 172/2, 4, 172/4.5, 7, 9, 10, 452, 459, 464, 465, 466; 37/348, 382, 414; 280/124.157, 124.158, 280/124.159, 124.16

See application file for complete search history.

(56) References Cited

U.S. PATENT DOCUMENTS

| | | | |
|---|---|---|---|
| 6,382,326 B1 | 5/2002 | Goins et al. | |
| 7,377,523 B2 * | 5/2008 | Schedgick et al. | 280/5.514 |
| 7,596,935 B2 * | 10/2009 | Bollinger et al. | 56/14.9 |
| 2005/0252699 A1 | 11/2005 | Schedgick et al. | |
| 2008/0093093 A1 | 4/2008 | Sheppard et al. | |

FOREIGN PATENT DOCUMENTS

DE    102006038801 A    2/2008

OTHER PUBLICATIONS

International Search Report of PCT/NL2010/000168 issued on Apr. 6, 2011.

* cited by examiner

*Primary Examiner* — Jamie L McGowan
(74) *Attorney, Agent, or Firm* — Hoyng Monegier LLP; Coraline J. Haitjema; David P. Owen

(57) ABSTRACT

An agricultural implement with a main frame and a movable subframe connected thereto has a fluid system which comprises an accumulator which provides a suspension effect to agricultural tools connected to the agricultural implement. This provides a simple, resilient hydraulic lifting system for an agricultural implement.

11 Claims, 7 Drawing Sheets

AGRICULTURAL IMPLEMENT WITH ACCUMULATOR SUSPENSION

CROSS REFERENCE TO RELATED APPLICATIONS

This application is a continuation of PCT application number PCT/NL2010/000168 filed on 9 Dec. 2010, which claims priority from Netherlands application number 1037612 filed on 5 Jan. 2010. Both applications are hereby incorporated by reference in their entireties.

BACKGROUND OF THE INVENTION

1. Field of the Invention

The present invention relates to an agricultural implement with a main frame and a movable subframe connected thereto. The agricultural implement has a fluid system which comprises an accumulator which provides a suspension effect to agricultural tools connected to the agricultural implement.

2. Description of the Related Art

US2008/0093093 shows a passive hydraulic system for lowering and raising an agricultural tool. The system has cylinders for moving down and keeping down agricultural tools which are movably connected to a frame. An accumulator which is closable by means of a valve is incorporated in a supply line for hydraulic liquid to the cylinders. When the system is pressurized in a hold-mode, the agricultural tools moving downwards in this case, the accumulator is in flow connection with the supply line by means of an open valve. There is provided a pressure safety valve in order to prevent that the pressure in the accumulator and the cylinders becomes too high. Consequently, when pressurizing the hydraulic system in the hold-mode, the pressure in the accumulator substantially equals a hold pressure in the cylinders. The pressure in the accumulator ensures, together with the pressure in the cylinders, a downward hold force of the agricultural tools. In a lifting-mode of the hydraulic system, the agricultural tools can be brought into a raised position. When the agricultural tools are brought into a raised position, the valve to the accumulator is closed, so that no hydraulic liquid can flow from the accumulator to the reservoir. As a result thereof, the high hold pressure of the accumulator is maintained.

A drawback of this passive hydraulic system is that the agricultural tools have a relatively rigid connection with the frame. As a result thereof, the suspension of the agricultural tools in the lifting-mode during transport leaves room for improvement. Owing to bumps or holes in the pavement, the relatively heavy agricultural tools can move upwards and downwards and generate large forces on the frame. This may lead to damage by cracks in the frame as a result of material fatigue.

U.S. Pat. No. 6,382,326 describes such a hydraulic system with suspension in a transport position by means of an accumulator. The hydraulic system has electro-hydraulically controlled lifting cylinders to move a frame portion upwardly and downwardly in a hinging manner. The lifting cylinders are controllable by associated electro-hydraulic control valves. There is provided a control unit ICU to actuate the control valves on the basis of signals from different potentiometers. In addition to the control unit ICU, there is provided an operable control unit OCU to adjust inlet parameters. On the basis of a comparison between the signals of the potentiometers and the inlet parameters, the lifting cylinders are actuated. By opening the control valves the lifting cylinders can be brought into a lifting-mode. When the lifting cylinders for transport have been brought into the lifting-mode, a suspension system present in the hydraulic system is activated. The suspension system has accumulators which can be brought into open flow connection with the lifting cylinders by operating electric valves. As a result of the open flow connection, the frame portion is resiliently suspended in the transport position.

A disadvantage of the known hydraulic system is that its functioning requires an active control. As a result thereof, the system has a complex configuration with numerous components. The presence of relatively many electronic components makes the system sensitive to operational failure in comparison with a passive system and, moreover, expensive.

BRIEF SUMMARY OF THE INVENTION

The object of the present invention is to obviate at least partially at least one of the above-mentioned drawbacks, or else to provide a usable alternative. In particular, the invention aims at providing an agricultural implement with a passive hydraulic system to keep an agricultural tool in a resilient manner in a raised position.

This object is achieved by an agricultural implement, comprising a main frame and a subframe, wherein the subframe is movably connected to the main frame, wherein the subframe is movable with respect to the main frame between a first mode and a second mode, wherein a fluid system is provided to move the subframe by supplying and discharging a fluid, comprising:

a conduit assembly to convey the fluid;

a pump to supply fluid to the conduit assembly;

a reservoir to receive fluid to be discharged from the conduit assembly;

an operable multiple position valve with an inlet connected to the pump and in flow connection therewith, an outlet connected to the reservoir and in flow connection therewith and a flow-through port connected to the conduit assembly and in flow connection therewith, wherein the multiple position valve has at least three positions to switch between:

a pump position, in which the inlet is in open flow connection with the flow-through port, in such a manner that the pump is in open flow connection with the conduit assembly to supply fluid to the conduit assembly;

a neutral position, in which the flow-through port is blocked, in such a manner that a discharge from the conduit assembly to the reservoir or a supply of fluid from the pump to the conduit assembly is blocked; and a discharge position, in which the flow-through port is in open flow connection with the reservoir, in such a manner that the reservoir is in open flow connection with the conduit assembly to discharge fluid from the conduit assembly;

an accumulator connected to the conduit assembly and in flow connection therewith to accumulate fluid;

a cylinder connected to the conduit assembly and in flow connection therewith to move the subframe;

a valve assembly connected to and in flow connection with the flow-through port of the multiple position valve and the cylinder and the accumulator, comprising:

a non-return valve, wherein the non-return valve, via a first valve port, is connected to and in open flow connection with the flow-through port and, via a second valve port, is connected to and in open flow connection with the accumulator, wherein the non-return valve is open at a flow direction of the fluid away from the accumulator (170) and towards the multiple position valve; and a pressure valve comprising
a first port in open flow connection with the flow-through port of the multiple position valve;
a second port in open flow connection with the accumulator and the second valve port of the non-return valve;
a third port in open flow connection with the cylinder;
a resiliently disposed closing element to close the first or the second port, respectively, wherein the closing element has a first and a second closing position, wherein
in the first closing position, the first port is closed and the third port to the cylinder is in open flow connection with the second port to the accumulator;
in the second closing position, the second port is closed and the third port to the cylinder is in open flow connection with the first port to the multiple position valve.

The agricultural implement according to the invention comprises a main frame and a subframe. The subframe is movably connected to the main frame. The subframe is movable with respect to the main frame between a first mode and a second mode, preferably between a lifting-mode and a low-mode, respectively. A fluid system is provided to move the subframe with respect to the main frame by supplying and discharging a fluid. The fluid may be a gaseous or liquid medium. The fluid system may be pneumatic or hydraulic. The fluid system comprises a conduit assembly to convey the fluid. The fluid system comprises a pump to supply fluid to the conduit assembly. The fluid system comprises a reservoir to receive fluid to be discharged from the conduit assembly. The fluid system comprises an operable multiple position valve, preferably a three-position valve, more preferably a 2/1 three-position valve, with an inlet P connected to the pump and in flow connection therewith, an outlet T connected to the reservoir and in flow connection therewith and a flow-through port S connected to the conduit assembly and in flow connection therewith. The multiple position valve has at least three positions for operably switching between a pump position, a neutral position and a discharge position. In the pump position, the inlet P is in open flow connection with the flow-through port S, in such a manner that the pump is in open flow connection with the conduit assembly to supply fluid to the conduit assembly. This means that fluid can be supplied to the cylinder. In the neutral position, the flow through port S is blocked, in such a manner that a discharge from the conduit assembly to the reservoir or a supply of fluid from the pump to the conduit assembly is blocked. This means that a conveyance of fluid can be stopped. In the discharge position, the flow-through port S is in open flow connection with the reservoir, in such a manner that the reservoir is in open flow connection with the conduit assembly to discharge fluid from the conduit assembly.

The fluid system further comprises an accumulator connected to the conduit assembly and in flow connection therewith to accumulate fluid. The accumulator can compensate for sudden pressure increases in the conduit assembly as a result of forces acting on the subframe. This means that the accumulator can act as a suspension.

The fluid system has at least one cylinder connected to the conduit assembly and in flow connection therewith to move the subframe.

The fluid system further comprises a valve assembly connected to and in flow connection with the flow-through port S of the multiple position valve and the cylinder and the accumulator.

The valve assembly comprises a non-return valve. Preferably, the non-return valve has a configuration with two valve ports, a closing member and a spring, wherein the closing member closes one of the two valve ports by spring pressure. The non-return valve is connected to and in open flow connection with the flow-through port S via a first valve port A and is connected to and in open flow connection with the accumulator via a second valve port B. The non-return valve is open at a flow direction of the fluid away from the accumulator and at a flow direction towards the multiple position valve.

The valve assembly further comprises a pressure valve. The pressure valve comprises a first port I in open flow connection with the flow-through port S of the multiple position valve; a second port II in open flow connection with the accumulator and the second valve port B of the non-return valve; a third port III in open flow connection with the cylinder; and a resiliently disposed closing element to close the first or the second port, respectively, wherein the closing element has a first closing position "1" and a second closing position "2". In the first closing position "1", the first port I is closed and the third port III to the cylinder is in open flow connection with the second port II to the accumulator. In the second closing position "2", the second port II is closed and the third port III to the cylinder is in open flow connection with the first port I to the multiple position valve.

The agricultural implement according to the invention can advantageously provide an improved suspension of the subframe with respect to the main frame. When the subframe is kept in the lifting-mode, sudden forces acting on the cylinder can be compensated by the accumulator as a result of the open flow connection between the accumulator and the cylinder. According to the invention, the open flow connection in the first closing position "1" is only achieved after the supply of hydraulic liquid from the pump to the cylinder has stopped. This means that hydraulic liquid is hardly or not supplied to the accumulator during the supply of hydraulic liquid to the cylinder. Therefore, the pressure in the accumulator is only established when the flow connection between the second port II to the accumulator and the third port III to the cylinder is open. This means that the pressure will be lower than in the case when the second port II to the accumulator would already be open during the supply of hydraulic liquid from the pump. As a result thereof, the accumulator can advantageously confer improved resilient properties to the cylinder. This may result in a softer and less rigid suspension. Collisions of agricultural tools affecting the cylinder can be better compensated by the connection of the accumulator with the pressure valve according to the invention.

The fluid system of the agricultural implement according to the invention is advantageously passively controlled. No active components, such as motors and processors, are required for the suspension effect.

In an embodiment of the agricultural implement according to the invention, the valve assembly further comprises a supply line, a cylinder line, an accumulator line and a return line. The supply line provides a flow connection between the pressure valve and the flow-through port S of the multiple position valve. The cylinder line provides a flow connection between the cylinder and the pressure valve. The accumulator line provides a flow connection between the accumulator and the pressure valve. The return line provides a flow connection between the accumulator and the flow-through port S of the multiple position valve, wherein the non-return valve is incorporated in the return line. In this embodiment, a simple and efficient configuration of the fluid system can advantageously be achieved.

In an embodiment of the agricultural implement according to the invention, the valve assembly comprises an adjustable non-return valve. The non-return valve preferably has a spring with an adjustable stroke. An adjusting screw for adjusting the spring pressure may be provided. The spring pressure can be set by means of a screwing motion of the adjusting screw. The spring pressure acting on the closing member can be adjusted by setting the spring, so that the non-return valve opens at a higher or lower pressure difference when the multiple position valve is brought into the discharge position. By setting a certain spring pressure, a certain accumulator pressure can be set at the same time. The set accumulator pressure can remain in the accumulator, as a result of which a ground pressure relief can be generated by the agricultural implement during operation.

In an embodiment of the agricultural implement according to the invention, the valve assembly comprises a housing, wherein the supply line, the cylinder line, the accumulator line and the return line are provided in the housing. A part of the conduit assembly can advantageously be integrated in one housing, so that incorporation of the fluid system and maintenance thereof can be simplified. The housing is preferably fixedly connected to the cylinder, for example by welding. The housing preferably comprises a cylinder outlet, an accumulator outlet and a multiple position valve inlet. The cylinder outlet serves for a connection with the cylinder, wherein the cylinder outlet is in flow connection with the cylinder line. The accumulator outlet serves for a connection with the accumulator, wherein the accumulator outlet is in flow connection with the accumulator line. The multiple position valve inlet serves to connect the multiple position valve, wherein the multiple position valve inlet is in flow connection with the pressure valve and the non-return valve. The valve assembly can advantageously be integrated in the housing. Both the pressure valve and the non-return valve can be integrated inside the housing. In an embodiment, the non-return valve can also be provided outside the housing. The fluid system can advantageously be simplified to a considerable extent by the presence of the housing.

In an embodiment of the agricultural implement according to the invention, the closing element of the pressure valve inside the housing is movable in a translating, reciprocating manner to close the first and the second port, respectively, of the pressure valve. The closing element of the pressure valve is preferably cylindrical. The translating movement can further improve the reliability of the functioning of the fluid system.

In an embodiment of the agricultural implement according to the invention, the housing has a manometer outlet to connect a manometer for measuring fluid pressure. A proper functioning of the fluid system during operation can thus advantageously be monitored.

In an embodiment of the agricultural implement according to the invention, the cylinder comprises a single-acting cylinder. The cylinder is preferably an assembly of two cylinders. The cylinder is preferably an assembly of a short stroke cylinder and a long stroke cylinder in order to enable the agricultural implement to move from the operative position to a headland position by means of the short stroke and to move from the headland position to a transport position by means of the long stroke.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1A:
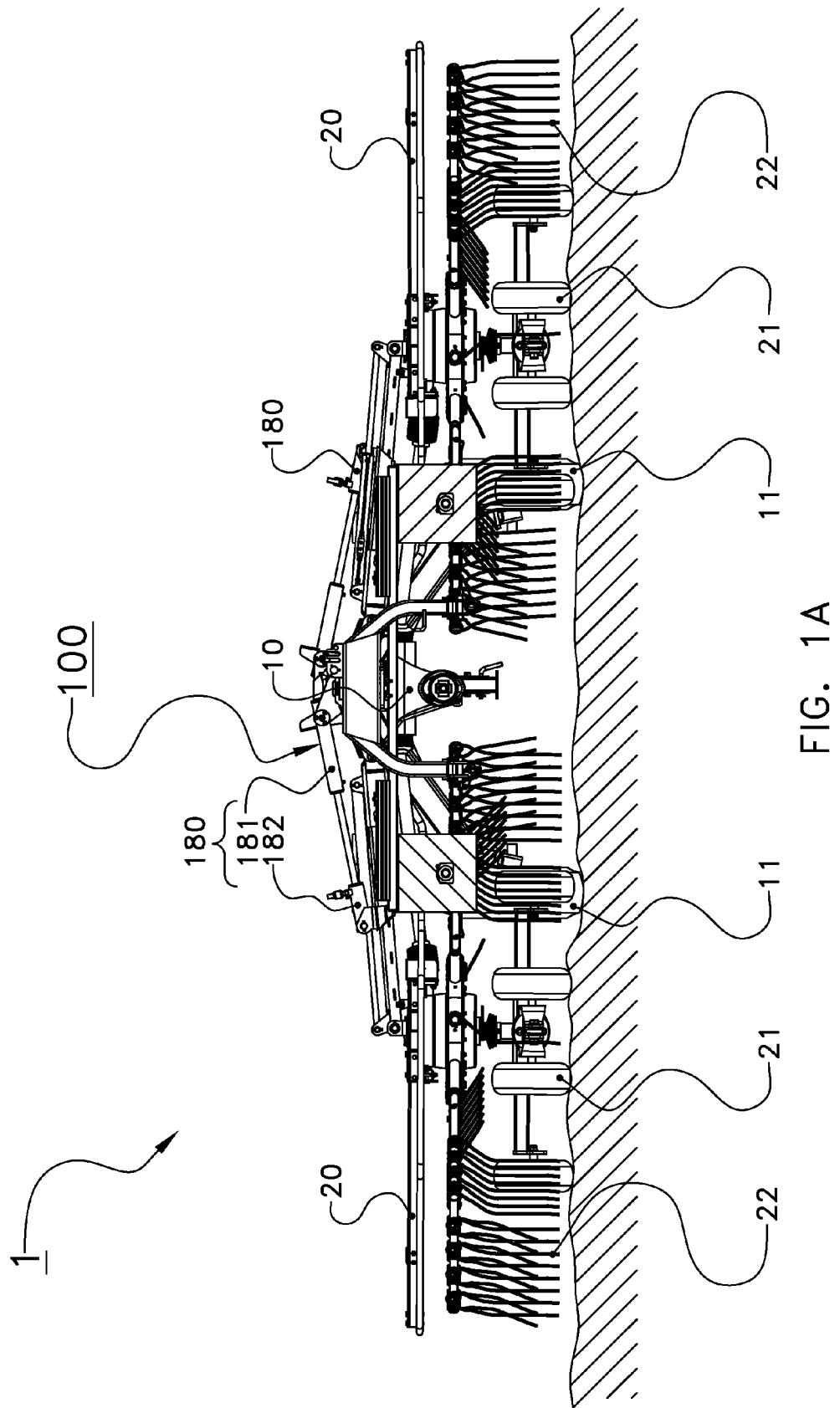
FIGS. 1A and 1B show in a rear view an agricultural implement according to the invention comprising a main frame and a hingeable subframe disposed on either side thereof.
Figure 1B:
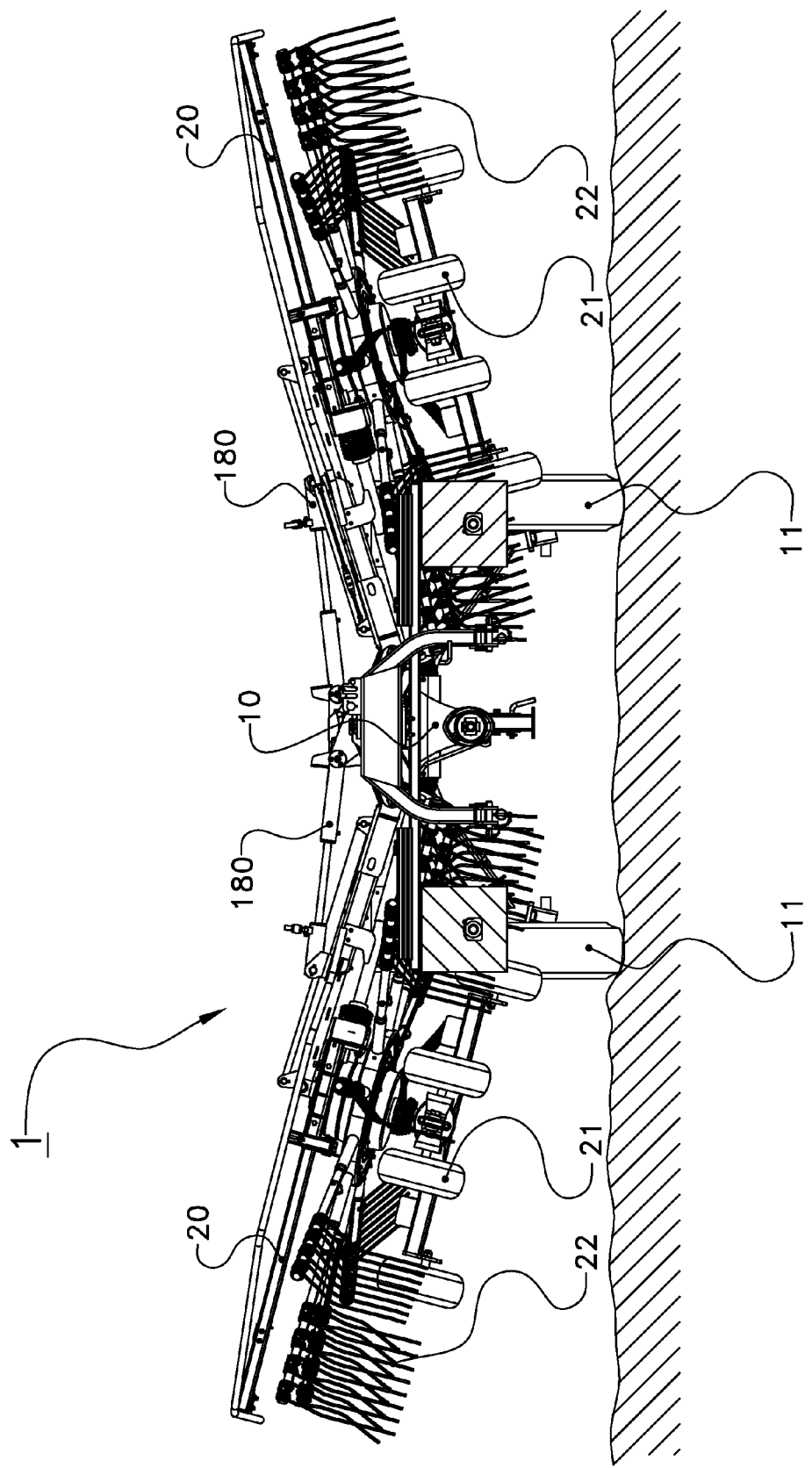

The following is a description of certain embodiments of the invention, given by way of example only and with reference to the drawings. FIGS. 1A and 1B show in a rear view an agricultural implement comprising a main frame 10 with a hingeable subframe 20 disposed on either side thereof. The main frame 10 is provided with a main wheel set 11. The subframe 20 is provided with a sub wheel set 21 and an agricultural tool 22, such as a rake member. The subframe 20 is hingeably connected to the main frame 10. In a first mode, the subframe can be kept in a low position, an operative position, as shown in FIG. 1A, in which the sub wheel set is in contact with the ground. In the low position, the agricultural tool 22 is in the operative position. The subframe can be raised to a transport position, in which the subframe is completely hinged upwardly. With inwardly folded subframes, the agricultural implement is compact for road transport. The subframe can also be hinged partially upwardly into a so-called headland position, as shown in FIG. 1B. In the headland position, the sub wheel set 21 is positioned free from the ground. In the headland position, the agricultural tool 22 is raised from the ground, so that the agricultural implement can make a turning movement on the ground.

The subframe 20 can be raised with respect to the main frame 10 with the aid of at least one lifting cylinder 180. The lifting cylinder is a hydraulic cylinder. The lifting cylinder has a first end connected to the subframe and a second end connected to the main frame. In the embodiment shown, the lifting cylinder is composed of two hydraulic cylinders that are interconnected in series. A double-acting cylinder 181 is connected in series to a single-acting cylinder 182. The double-acting cylinder 181 has a long stroke. The double-acting cylinder is operable to move the subframe from the headland position to the transport position and vice versa. The single-acting cylinder has a short stroke and is operable to move the subframe from the low operative position to the headland position and vice versa. When the subframe is raised to the headland position, a pressure is built up in the single-acting cylinder 182. The subframe 20 is lowered under the influence of its own weight, with the hydraulic pressure then decreasing.

Figure 2:
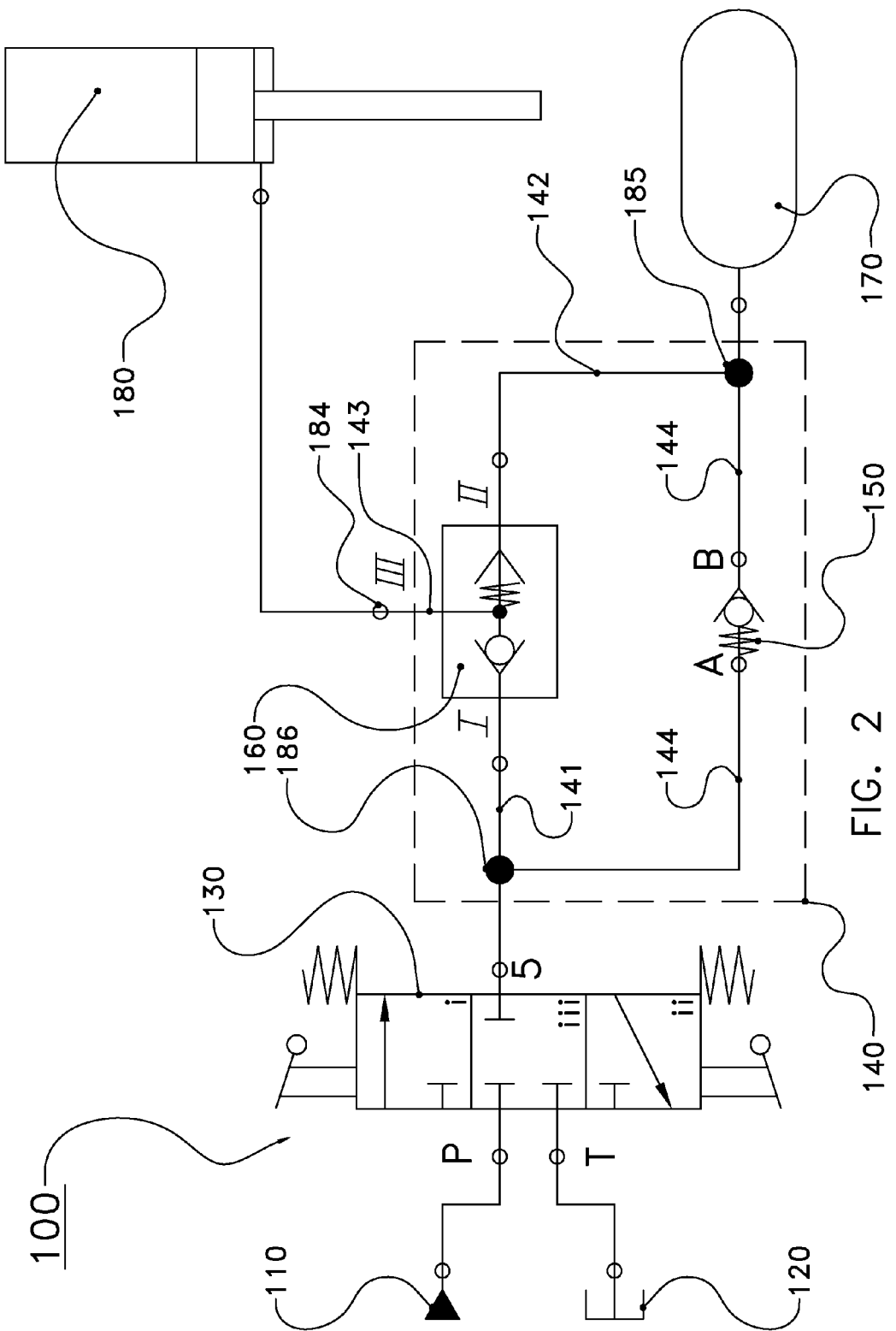
FIG. 2 shows a flowchart of a fluid system for moving the subframe of the agricultural implement according to the invention.

For the operation of the lifting cylinder there is provided a hydraulic system 100 with a hydraulic conduit assembly to convey a hydraulic liquid. FIG. 2 shows the hydraulic system in a flowchart. The hydraulic system comprises a three-position valve 130 which is operable by a user and which is connected to and in flow connection with a pump 110 and a hydraulic reservoir 120. The hydraulic system further comprises a cylinder 180 and an accumulator 170. The accumulator is a gas spring accumulator and can accumulate hydraulic liquid from the conduit assembly.

The operable three-position valve 130 can be operated from a tractor. The three-position valve 130 has an inlet P, an outlet T and a flow-through port S. The inlet P is connected to the pump 110 and in flow connection therewith. The outlet T is connected to the reservoir 120 and in flow connection therewith. The flow-through port S is connected to and in flow connection with the conduit assembly with the cylinder and the accumulator.

In a first pump position i of the three-position valve 130, the pump 110 is in flow connection with a valve assembly 140 in the hydraulic conduit assembly. In the first pump position i, the hydraulic cylinder 180 can be pressurized. In a second discharge position ii, a flow connection is open to the reservoir 120 and the hydraulic pressure in the conduit assembly can decrease. By bringing the operable three-position valve 130 into the discharge position, the subframe 20 can be moved to the low operative position under the influence of its own weight. In a third position iii, also called neutral position, the flow connection between the valve assembly 140 and the pump 110 or the reservoir 120 is blocked. In the neutral position, the lifting cylinder 180 can be kept in one position. In the neutral position, the lifting cylinder 180 can be kept in an intermediate position between the headland position and the low operative position.

The valve assembly 140, which is in flow connection with the three-position valve 130, has a non-return valve 150 and a pressure valve 160.

The non-return valve 150 has a first valve port A and a second valve port B. The first valve port A is connected to the pump 110 by means of the three-position valve 130, and the second valve port B is connected to the accumulator 170. There is provided a resiliently disposed closing member 151, in this case a ball, to open or close the non-return valve. The non-return valve 150 is closed at a flow direction of the hydraulic liquid towards the accumulator 170. At a flow direction of the hydraulic liquid away from the accumulator 170 and towards the reservoir 120, the non-return valve 150 is open.

The pressure valve comprises three ports I, II, III. A first port I of the pressure valve 160 can be brought, via the three-position valve 130, into flow connection with the pump 110 or the reservoir 120, respectively. The flow connection with the first port I of the pressure valve 160 can be blocked by the three-position valve 130 in the neutral position. A second port II of the pressure valve is connected to the accumulator 170 and in flow connection therewith. The second port II is further, via the non-return valve 150, in flow connection with the three-position valve 130. The third port III is positioned between the first port I and the second port II. The third port III of the pressure valve 160 is connected to the single-acting hydraulic cylinder 180. The third port III is in flow connection with the lifting cylinder 180.

The pressure valve has a resiliently disposed closing element 161. During operation, the closing element of the pressure valve can assume two closing positions 1 or 2. The closing element 161 is cylindrical and incorporated in a translating manner in a duct which extends from the first port I to the second port II.

In a first closing position 1, the closing element closes the first port I to the pump 110 and the second port II is open. There is provided a spring 162 which presses the closing element 161 against the first port I. The first closing position corresponds to the neutral position iii of the three-position valve 130, in which the conveyance of hydraulic liquid to the reservoir 120 is blocked, and also corresponds to the discharge position ii of the three-position valve 130, in which a flow connection to the reservoir 120 is open. In the first closing position (as shown), the closing element 161 closes the first port I to the pump 110.

In a second closing position 2, the closing element 161 closes the second port II of the pressure valve 160. The second closing position 2 corresponds to the pump position i of the three-position valve 130, in which a flow connection to the pump 110 is open. The supply of hydraulic liquid exerts a force on the closing element 161, which force is opposite to the spring pressure exerted by the spring. Due to the counterpressure, the closing element 161 will move to the second closing position. As a result thereof, the third port to the cylinder 180 will come into open flow connection with the first port I, and the second port II to the accumulator 170 will be closed by the closing element 161.

Figure 3:
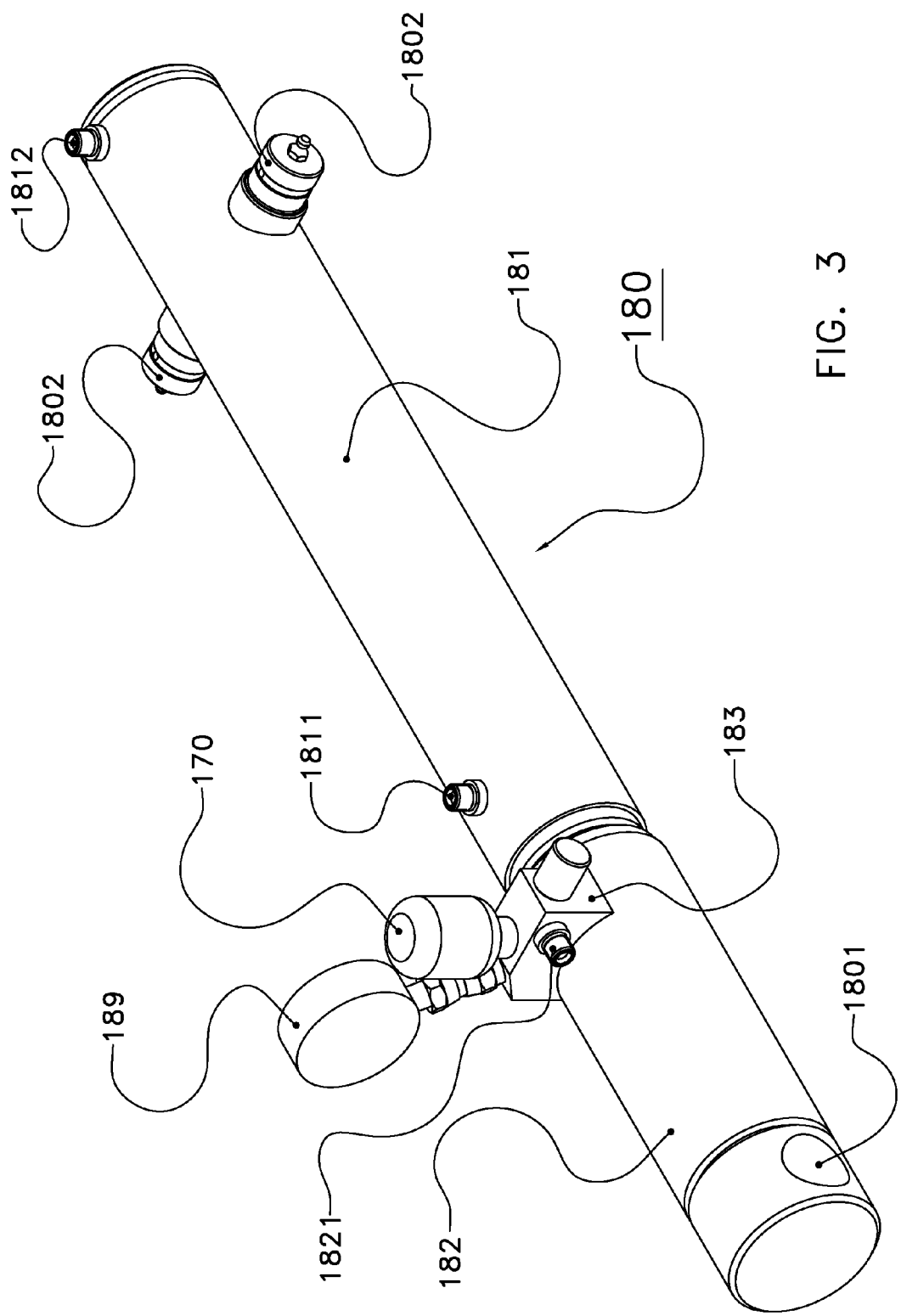
FIG. 3 shows in a perspective side view a lifting cylinder to be applied in the agricultural implement according to the invention.

FIG. 3 shows in a perspective side view a lifting cylinder 180 to be applied in the agricultural implement according to the invention. At its ends, the lifting cylinder is provided with mounting points 1801, 1802 for mounting the lifting cylinder to the main frame 10 and the subframe 20, respectively. The lifting cylinder is composed of two hydraulic cylinders which are interconnected in series. A double-acting cylinder 181 is connected to a single-acting cylinder 182.

The double-acting cylinder 181 has a first connection 1811 and a second connection 1812 for a hydraulic line. The single-acting cylinder 182 has a single connection 1821 for a hydraulic line. The cylinders 181, 182 each have a cylinder housing. A piston with piston rod is provided in the cylinder housing. The cylinders are coupled to each other by a coupling of the respective piston rods.

The single-acting cylinder 182 is provided with a housing 183. The housing 183 is fixedly connected, by welding or clamping, to the cylinder housing of the single-acting cylinder 182. The single connection 1821 is provided at the outside of the housing 183. The connection 1821, or multiple position valve inlet 186, is in flow connection with the multiple position valve. The multiple position valve inlet is in flow connection with the pressure valve and the non-return valve. The housing has a cylinder outlet 184 for a connection with the cylinder, wherein the cylinder outlet is in flow connection with the cylinder line. The housing further comprises an accumulator outlet 185 for a connection with the accumulator, wherein the accumulator outlet is in flow connection with the accumulator line. On the housing 183 there is provided an accumulator 170 for receiving hydraulic liquid from the conduit assembly and a manometer 189 for measuring occurring pressures of the hydraulic liquid. The manometer 189 is connected to the housing via a manometer port 188.

Figure 4A:
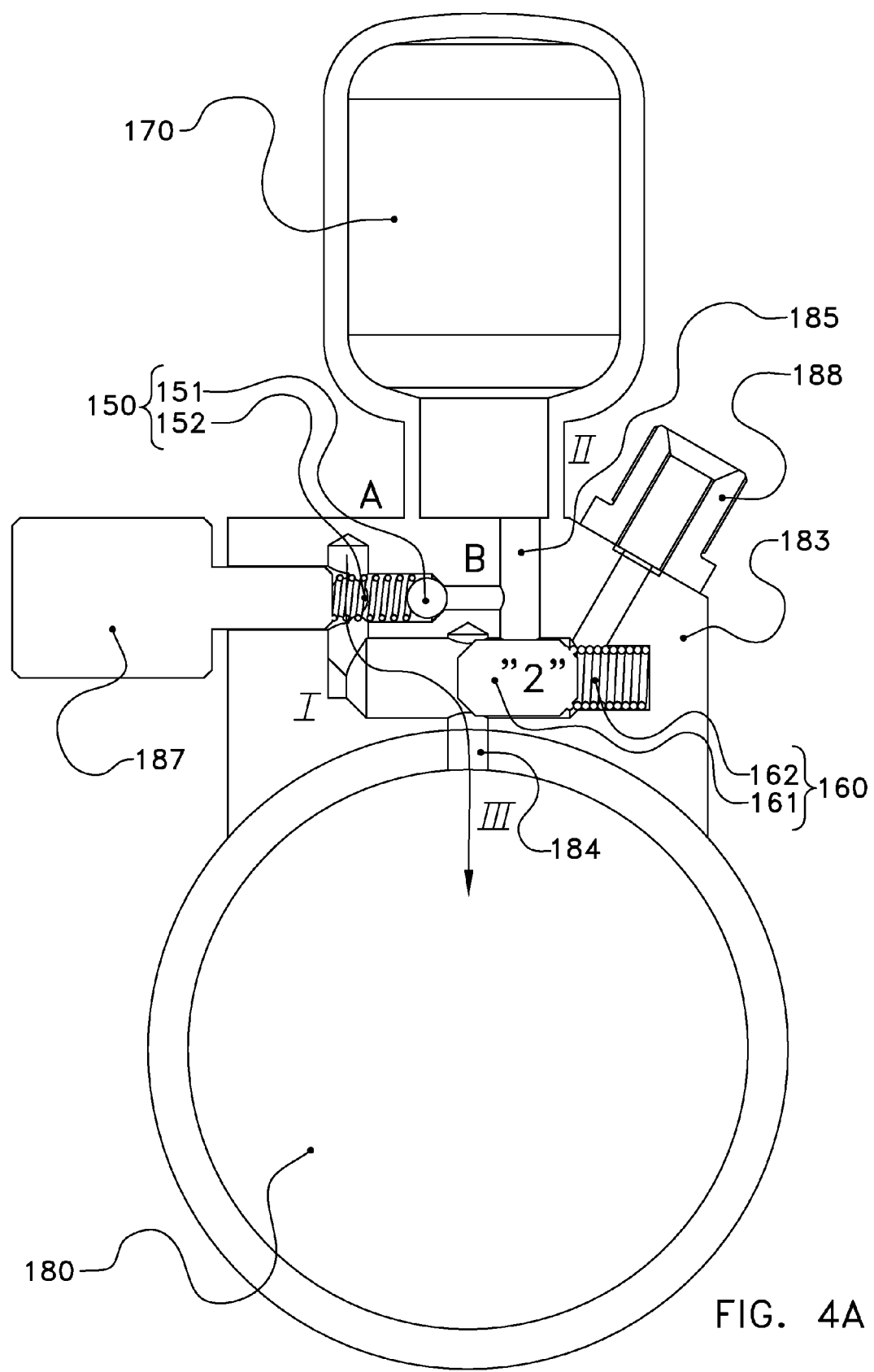
FIGS. 4A-4C show different operative positions of a valve assembly in a cross-sectional view at a housing of the lifting cylinder as shown in FIG. 3.
Figure 4B:
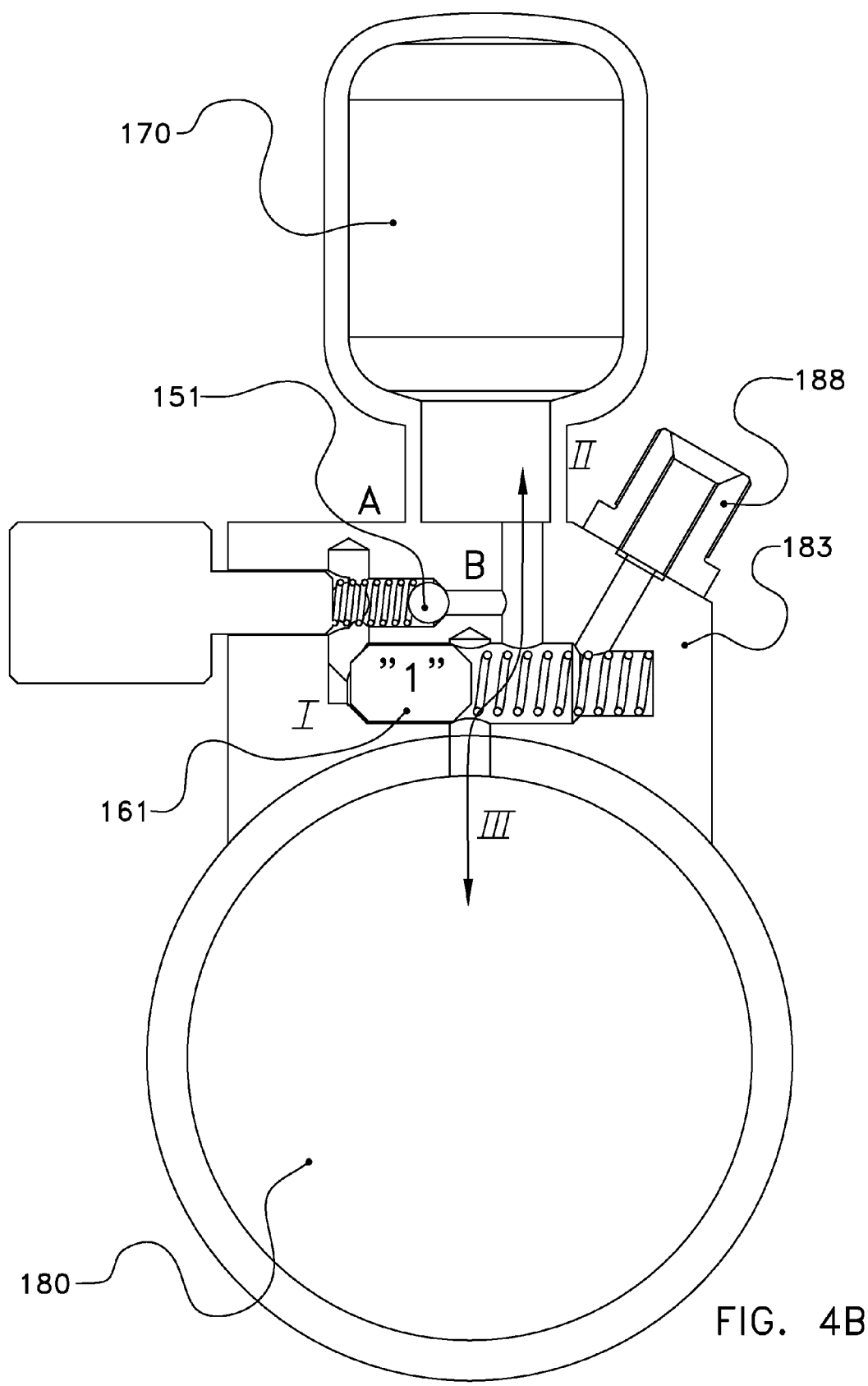
Figure 4C:
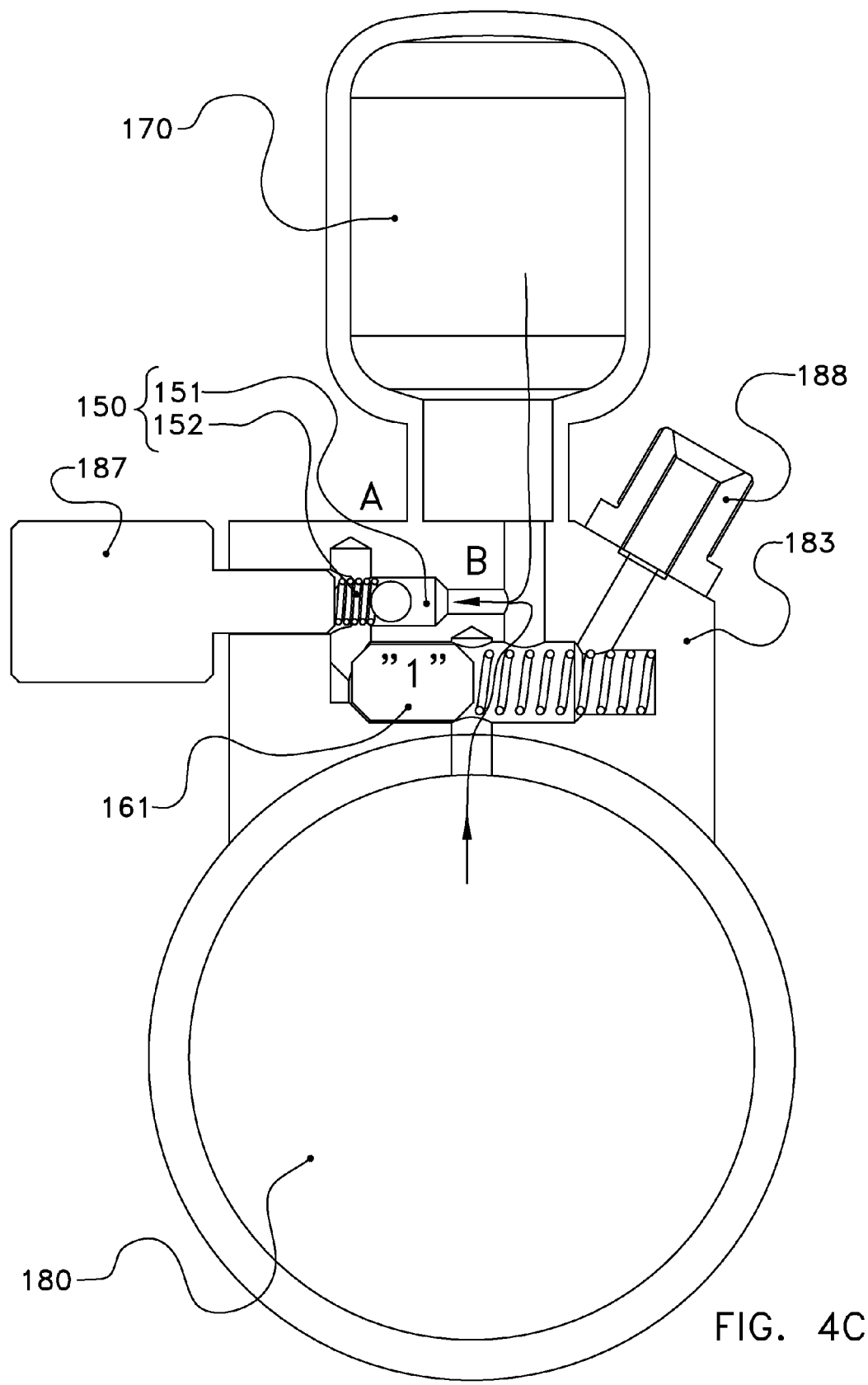

FIGS. 4A-4C show, in a cross-sectional view, different operative positions of the valve assembly 140 at the housing 183 of the lifting cylinder 180 as shown in FIG. 3. The figures show the housing 183 with the multiple position valve inlet 186, the cylinder outlet 184 and the accumulator outlet 185.

FIG. 4A shows, in a cross-sectional view, the pressure valve 160 of the valve assembly 140 in the second closing position "2". The second closing position "2" corresponds to a first pump position i of the three-position valve. In the pump position i of the three-position valve 130, the pump 110 is in open flow connection with the first port I of the pressure valve 160. The supply of hydraulic liquid to the first port I will make the closing element 161 move away from the first pump, against the spring pressure of a spring 162, to the second port II. As a result thereof, the second port II of the pressure valve 160 will be closed and thus the flow connection to the accumulator 170 will be closed. In the second closing position "2" of the pressure valve 160, the third port III to the cylinder 180 is open. As shown by an arrow, in the second closing position "2", there is provided an open flow connection between the first port I and the third port III. This enables a supply of hydraulic liquid from the pump 110 to the cylinder 180.

FIG. 4B shows, in a cross-sectional view, the closing element 161 of the pressure valve 160 in a first closing position "1". The first closing position "1" of the pressure valve 160 corresponds to the three-position valve 130 in the second position, i.e. the discharge position, or in the third position, i.e. the neutral position. FIG. 4B shows the valve assembly 140 in accordance with a neutral position iii of the three-position valve 130, in which the pump 110 and the reservoir 120 are closed. By switching off the pump 110 with the aid of the three-position valve 130, the supply of hydraulic liquid from the pump 110 to the first port of the pressure valve 160 will stop, and the closing element 161 will close the first port I by spring pressure. In the first closing position "1" of the closing element 161, the second port II to the accumulator 170 is in open flow connection with the third port III to the hydraulic cylinder 180. The open flow connection is denoted in the figure by an arrow between the accumulator 170 and the cylinder 180. This means that, in the neutral position iii of the three-position valve 130, hydraulic liquid can flow from and to the accumulator 170. Due to the open flow connection between the accumulator 170 and the cylinder 180, sudden forces acting on the cylinder 180 can advantageously be compensated by the accumulator 170. The open flow connection in the first closing position "1" is only realized after the supply of hydraulic liquid from the pump 110 to the cylinder 180 has stopped. This means that hydraulic liquid is hardly or not supplied to the accumulator 170 during the supply of hydraulic liquid to the cylinder 180. The pressure in the accumulator 170 is only generated when the flow connection between the second port II to the accumulator 170 and the third port III to the cylinder 180 is open. This means that the pressure will be lower than in the case when the second port II to the accumulator would already be open during the supply of hydraulic liquid from the pump 110. As a result thereof, the accumulator 170 can advantageously confer improved resilient properties to the cylinder 180. This may result in a softer and less rigid suspension. Collisions of agricultural tools affecting the cylinder 180 can be better compensated by the connection of the accumulator 170 with the pressure valve 160 according to the invention.

FIG. 4C shows, in a cross-sectional view, the valve assembly 140 with the closing element 161 of the pressure valve 160 in the first closing position "1", in which the first port I is closed, and an open non-return valve 150. The valve assembly shown in FIG. 4C corresponds to the discharge position ii of the three-position valve 130, in which an open flow connection to the reservoir is provided. Hydraulic liquid can flow, via the non-return valve 150 and the three-position valve 130, back to the reservoir 120. The non-return valve 150 is shown in an open position. A flow of hydraulic liquid from the accumulator 170 and from the cylinder 180 via valve port A of the non-return valve 150 to the pump 110 is shown by arrows. The hydraulic liquid will flow back to the reservoir 120 by the own weight of a subframe 20 which is fastened to an end of the single-acting cylinder 182. Due to the flowing back of the hydraulic liquid, the subframe 20 with one or more agricultural tools 22 fastened thereto can be brought into the low position, i.e. the operative position.

The non-return valve 150 is adjustable. The non-return valve 150 is provided with an adjusting screw 187 for adjusting the spring pressure of the spring 152. The spring pressure on the closing member 151 can be increased by turning inwards the adjusting screw in the housing 183. By increasing the spring pressure, the non-return valve will only open at a larger pressure difference over the valve ports A and B.

In addition to the embodiments shown, various variants are possible without thereby departing from the scope of protection, such as is defined in the enclosed claims. Instead of the embodiment shown, in which the pressure valve and the non-return valve are integrated, the conduit assembly may also be composed of a separately arranged pressure valve and non-return valve. The non-return valve may, for example, be connected to hydraulic metal conduits or flexible hoses according to the flowchart of FIG. 2. Instead of a lifting cylinder which is composed of a single-acting and a double-acting cylinder, only one single-acting cylinder will suffice as well. Furthermore, the fluid system may be pneumatic instead of hydraulic.

According to the invention, there is thus provided an agricultural implement with a fluid system, wherein an improved suspension can be achieved when an agricultural tool is kept in a raised position. The risk of the agricultural implement being damaged can thus advantageously be reduced further.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. An agricultural implement comprising a main frame and a subframe, wherein the subframe is movably connected to the main frame, wherein the subframe is movable with respect to the main frame between a first mode and a second mode, wherein a fluid system is provided to move the subframe by supplying and discharging a fluid, comprising:
   a conduit assembly to convey the fluid;
   a pump to supply fluid to the conduit assembly;
   a reservoir to receive fluid to be discharged from the conduit assembly;
   an operable multiple position valve with an inlet connected to the pump and in flow connection therewith, an outlet connected to the reservoir and in flow connection therewith and a flow-through port connected to the conduit assembly and in flow connection therewith, wherein the multiple position valve has at least three positions to switch between:
      a pump position, in which the inlet is in open flow connection with the flow-through port, such that the pump is in open flow connection with the conduit assembly to supply fluid to the conduit assembly;
      a neutral position, in which the flow-through port is blocked, such that a discharge from the conduit assembly to the reservoir or a supply of fluid from the pump to the conduit assembly is blocked; and
      a discharge position, in which the flow-through port is in open flow connection with the reservoir, such that the reservoir is in open flow connection with the conduit assembly to discharge fluid from the conduit assembly;
   an accumulator connected to the conduit assembly and in flow connection therewith to accumulate fluid;
   a cylinder connected to the conduit assembly and in flow connection therewith to move the subframe;
   a valve assembly connected to and in flow connection with the flow-through port of the multiple position valve and the cylinder and the accumulator, comprising:
      a non-return valve, wherein the non-return valve, via a first valve port, is connected to and in open flow connection with the flow-through port and, via a second valve port, is connected to and in open flow connection with the accumulator, wherein the non-return valve is open at a flow direction of the fluid away from the accumulator and towards the multiple position valve; and
      a pressure valve comprising a first port in open flow connection with the flow-through port of the multiple position valve;

a second port in open flow connection with the accumulator and the second valve port of the non-return valve;

a third port in open flow connection with the cylinder;

a resiliently disposed closing element to close the first or the second port, respectively, wherein the closing element has a first and a second closing position, wherein in the first closing position, the first port is closed and the third port to the cylinder is in open flow connection with the second port to the accumulator; and in the second closing position, the second port is closed and the third port to the cylinder is in open flow connection with the first port to the multiple position valve.

2. The agricultural implement according to claim 1, wherein the valve assembly further comprises:

a supply line providing a flow connection between the pressure valve and the flow-through port of the multiple position valve;

a cylinder line providing a flow connection between the cylinder and the pressure valve;

an accumulator line providing a flow connection between the accumulator and the pressure valve; and a return line providing a flow connection between the accumulator and the flow-through port of the multiple position valve, wherein the non-return valve is incorporated in the return line.

3. The agricultural implement according to claim 1, wherein the valve assembly comprises a housing, wherein the supply line, the cylinder line, the accumulator line and the return line are provided in the housing, comprising a cylinder outlet for a connection with the cylinder, wherein the cylinder outlet is in flow connection with the cylinder line;

an accumulator outlet for a connection with the accumulator, wherein the accumulator outlet is in flow connection with the accumulator line; and a multiple position valve inlet to connect the multiple position valve, wherein the multiple position valve inlet is in flow connection with the pressure valve and the non-return valve.

4. The agricultural implement according to claim 1, wherein at least one of the pressure valve and the non-return valve are provided inside the housing.

5. The agricultural implement according to claim 1, wherein the housing is fixedly connected to the cylinder.

6. The agricultural implement according to claim 1, wherein the non-return valve is adjustable such that the non-return valve has a setting in which the non-return valve opens at a pressure difference over the valve ports that corresponds to the setting.

7. The agricultural implement according to claim 1, wherein the closing element of the pressure valve inside the housing is movable in a translating, reciprocating manner to close the first and the second port, respectively, of the pressure valve.

8. The agricultural implement according to claim 1, wherein the closing element of the pressure valve is cylindrical.

9. The agricultural implement according to claim 1, wherein the cylinder comprises a single-acting cylinder.

10. The agricultural implement according to claim 1, wherein the housing has a manometer outlet to connect a manometer to monitor fluid pressure.

11. The agricultural implement according to claim 1, wherein the fluid system is a hydraulic system.

\* \* \* \* \*